US008522710B2

(12) United States Patent
Bishop

(10) Patent No.: US 8,522,710 B2
(45) Date of Patent: Sep. 3, 2013

(54) SHAPED METAL DEPOSITION APPARATUS

(75) Inventor: Jeffrey C Bishop, Derby (GB)

(73) Assignee: Rolls-Royce PLC, London (GB)

( * ) Notice: Subject to any disclaimer, the term of this patent is extended or adjusted under 35 U.S.C. 154(b) by 337 days.

(21) Appl. No.: 12/743,618

(22) PCT Filed: Oct. 28, 2008

(86) PCT No.: PCT/GB2008/003641
§ 371 (c)(1),
(2), (4) Date: Jun. 16, 2010

(87) PCT Pub. No.: WO2009/068842
PCT Pub. Date: Jun. 4, 2009

(65) Prior Publication Data
US 2010/0251961 A1    Oct. 7, 2010

(30) Foreign Application Priority Data
Nov. 28, 2007    (GB) .................................. 0723244.0

(51) Int. Cl.
*B05C 11/00*    (2006.01)
*B23K 9/00*    (2006.01)
*B23K 9/16*    (2006.01)
*B23K 13/00*    (2006.01)
*B23K 13/06*    (2006.01)
*B23K 35/38*    (2006.01)

(52) U.S. Cl.
USPC ................... 118/64; 118/58; 219/50; 219/72; 219/74

(58) Field of Classification Search
None
See application file for complete search history.

(56) References Cited

U.S. PATENT DOCUMENTS

| | | | | | |
|---|---|---|---|---|---|
| 3,135,850 | A | * | 6/1964 | Scheller et al. | 219/60 A |
| 3,844,468 | A | * | 10/1974 | Nelson et al. | 228/13 |
| 4,332,996 | A | * | 6/1982 | Janssen | 219/76.14 |
| 4,952,769 | A | * | 8/1990 | Acheson | 219/76.14 |
| 5,298,710 | A | * | 3/1994 | Acheson et al. | 219/76.14 |

FOREIGN PATENT DOCUMENTS

| | | |
|---|---|---|
| EP | 1 245 322 A1 | 10/2002 |
| EP | 1 563 939 A1 | 8/2005 |
| GB | 2 406 818 A | 4/2005 |

OTHER PUBLICATIONS

International Search Report issued on Feb. 4, 2009 in International Application No. PCT/GB2008/003641.
Written Opinion of the International Searching Authority issued on Feb. 4, 2009 in International Application No. PCT/GB2008/003641.

* cited by examiner

*Primary Examiner* — Dah-Wei Yuan
*Assistant Examiner* — Jethro Pence
(74) *Attorney, Agent, or Firm* — Oliff & Berridge, PLC

(57) ABSTRACT

Shaped metal deposition apparatus comprises a mounting head for mounting a shaped metal deposition device, an inert gas shield for providing an inert atmosphere around shaped metal deposited in use by the shaped metal deposition device, and a rotatable coupling between the mounting head and the inert gas shield to permit relative rotation therebetween.

19 Claims, 5 Drawing Sheets

SHAPED METAL DEPOSITION APPARATUS

The present invention relates to shaped metal deposition apparatus.

The use of shaped metal deposition (SMD) apparatus for repairing components is known. For example, where the metal material of a component has degraded over time, for example due to corrosion, the degraded metal can be removed, such as by machining, and replaced using SMD apparatus.

In order to prevent oxidation of shaped metal deposited using SMD apparatus, it is known to provide an inert atmosphere in the form of a fog or cloud about the deposited shaped metal. Typically, an inert gas, such as Argon, can be utilised in order to create an acceptable atmosphere about the deposited shaped metal. It will be understood that the inert atmosphere is necessary to avoid oxidation above particular temperatures for the particular metal or alloy that has been deposited. In such circumstances, in addition to the particular period when the weld is created, it is also typically necessary to maintain an inert atmosphere until the weld material has cooled below a particular temperature. For example, in the case of titanium and titanium alloys, this temperature is generally in the region of 400° C.

Sealed cabinets have previously been utilised to provide the inert atmosphere, but these have practical problems, particularly in cases where repairs need to be made to large components, such as gas turbine engines. More recently, localised inert gas shields have generally been employed to create a localised inert atmosphere about the deposited shaped metal.

According to one aspect of the present invention, there is provided shaped metal deposition apparatus comprising a mounting head for mounting a shaped metal deposition device, an inert gas shield for providing an inert atmosphere around shaped metal deposited in use by the shaped metal deposition device, characterised in that the apparatus includes a rotatable coupling between the mounting head and the inert gas shield to permit relative rotation therebetween.

The inert gas shield may be generally arc-shaped.

The rotatable coupling may comprise a first gas transfer plate which may be connected to the inert gas shield. The rotatable coupling may comprise a second gas transfer plate which may be connected to the mounting head. The rotatable coupling may comprise a bearing arrangement between the first and second gas transfer plates, and the bearing arrangement may be operable to permit relative rotation between the first and second gas transfer plates, and hence said relative rotation between the mounting head and the inert gas shield.

The bearing arrangement may include first and second annular bearing members which may be rigidly secured to one of the first and second gas transfer plates.

The first annular bearing member may comprise a first annular disc and may be in abutment with one of the first and second gas transfer plates. The second annular bearing member may comprise a second annular disc and may be in abutment with the first annular bearing member. The first and second annular bearing members may be rigidly secured to one of the first and second gas transfer plates such that central apertures defined in the first and second annular bearing members are arranged about a common axis.

The central aperture defined in the first annular bearing member may be of a greater diameter than the central aperture defined in the second annular bearing member.

The first and second annular bearing members may be rigidly secured to the first gas transfer plate which may comprise a gas inlet plate. The first annular bearing member may thus be in abutment with the first gas transfer plate, and the first and second annular bearing members may be rigidly secured to the first gas transfer plate.

The bearing arrangement may include a plurality of annular bearing elements which may be rigidly secured to the other of the first and second gas transfer plates. The plurality of annular bearing elements may comprise a first annular bearing element which may be located in the central aperture defined in the first annular bearing member and may comprise a second annular bearing element which may be in abutment with the first annular bearing element and which may be located in the central aperture defined in the second annular bearing member.

The plurality of bearing elements may comprise a third annular bearing element which may be in abutment with the second annular bearing element and which may have an outer diameter greater than the outer diameter of the second annular bearing element.

The bearing arrangement may include an annular spacer element which may be in abutment with the third annular bearing element and which may be in abutment with said other of the first and second gas transfer plates. The annular spacer element may also be rigidly secured to said other of the first and second gas transfer plates.

The plurality of annular bearing elements and the annular spacer element may be rigidly secured to said other of the first and second gas transfer plates such that central apertures defined in the plurality of annular bearing elements and the annular spacer element are arranged about a common axis.

The bearing elements may comprise annular discs defining apertures therein.

The plurality of annular bearing elements and the spacer element may be rigidly secured to the second gas transfer plate which may comprise a gas outlet plate. The spacer element may thus be in abutment with the second gas transfer plate, and the plurality of annular bearing elements and the annular spacer element may be rigidly secured to the gas outlet plate.

The mounting head may include a chamber for inert gas. The rotatable coupling may define a gas transfer path for transferring inert gas from the inert gas shield to the mounting head, for example from the chamber of the inert gas shield to the chamber of the mounting head.

The gas transfer path may be defined at least in part by the bearing arrangement. The gas transfer path may be defined by apertures in the first and second gas transfer plates and may be defined by the central apertures in the plurality of bearing elements and the spacer element.

One or both of the first and second gas transfer plates may include a plurality of gas distribution ports which may be arranged to direct inert gas towards deposited shaped metal in an area underlying the rotatable coupling, between the inert gas shield and the mounting head.

The apparatus may include first and second connecting members which may be arranged to connect the first and second gas transfer plates to the inert gas shield and the mounting head.

One or both of the first and second connecting members may include a plurality of gas transfer ports which may be arranged to direct inert gas towards deposited shaped metal in an area underlying one or both of the first and second connecting members.

The rotatable coupling, and possibly one or both of the first and second connecting members, may include at least one lateral reinforcement member. The or each lateral reinforcement member may be perforated to permit the passage of inert gas therethrough.

The rotatable coupling may be arranged to permit relative rotation between the mounting head and the inert gas shield by an amount up to 360°.

The rotatable coupling may include a rotation limiter to permit up to a predetermined amount of relative rotation between the mounting head and the inert gas shield. The rotation limiter may extend between the first and second gas transfer plates to limit the relative rotation between the plates, and hence limit the amount of relative rotation between the mounting head and the inert gas shield.

An embodiment of the present invention will now be described by way of example only, and with reference to the accompanying drawings, in which.

Figure 1:
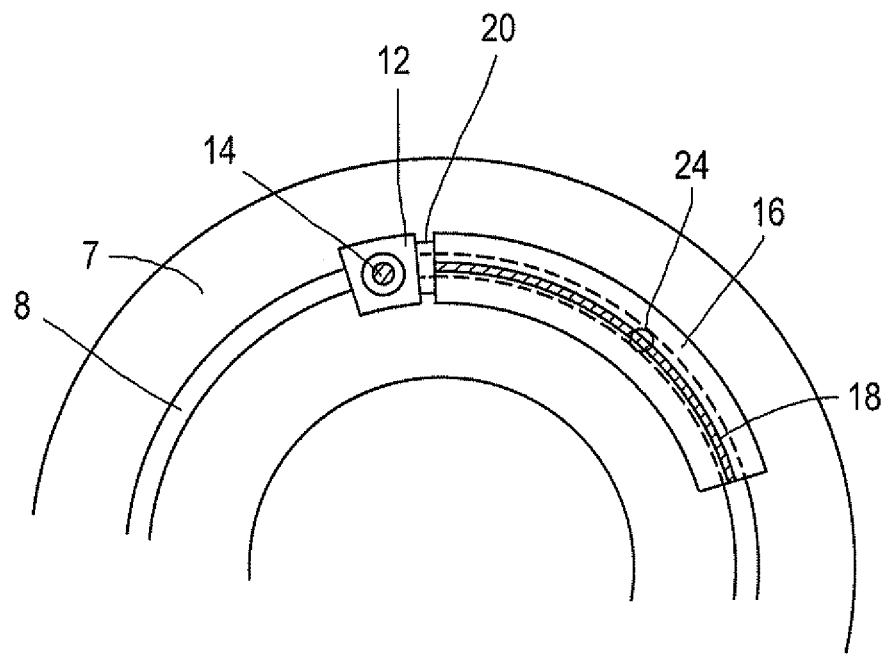
FIG. 1 is a diagrammatic perspective view of shaped metal deposition apparatus according to the invention.

FIG. 1 shows generally an end view of part of a generally circumferential component 7, which may for example be the casing of a gas turbine engine. The component 7 includes an annular channel 8 extending circumferentially around an end face of the component. For example, where the component 7 is a gas turbine engine intercase, the annular channel 8 may typically carry a seal. The breakdown of this seal over time due to attack by oils and other lubricants may produce hydrofluoric acid which may cause decay of the intercase material, typically titanium alloy.

In order to repair the intercase, the damaged seal can be removed and the decayed material removed from the annular channel 8 by an appropriate operation, such as machining. Replacement titanium material can then be deposited, layer by layer, in the machined annular channel 8 using a shaped metal deposition (SMD) device before a new seal is located in the annular channel 8.

FIG. 1 shows shaped metal deposition apparatus 10 which can be used to deposit shaped metal, for example to effect a repair to a component such as an intercase as described above. The shaped metal deposition apparatus 10 generally comprises a mounting head 12 for mounting a shaped metal deposition device 14, an inert gas shield 16 for providing an inert atmosphere around shaped metal 18 deposited by the shaped metal deposition device 14, and a rotatable coupling 20 between the mounting head 12 and the inert gas shield 16 to permit relative rotation between the mounting head 12 and the inert gas shield 16.

It will be appreciated from FIG. 1 that, in the illustrated embodiment, the inert gas shield 16 is generally arc-shaped. This is necessary to ensure that an inert atmosphere is maintained around metal deposited in the annular channel 8 by the shaped metal deposition device 14 to shield the deposited metal until it has cooled to a temperature below that at which oxidation occurs. Clearly, the dimensions, and in particular the length, of the inert gas shield 16 will need to be selected to ensure that sufficient shielding is obtained.

The inert gas shield 16 is generally box-shaped to define a chamber 22 for the inert gas and includes an inlet for the inert gas. A lower panel 26 of the inert gas shield 16 comprises a plurality of apertures (not shown) through which inert gas may exit the chamber 22 to provide an inert fog or cloud about the deposited shaped metal 18 underlying the inert gas shield 16.

Figure 2:
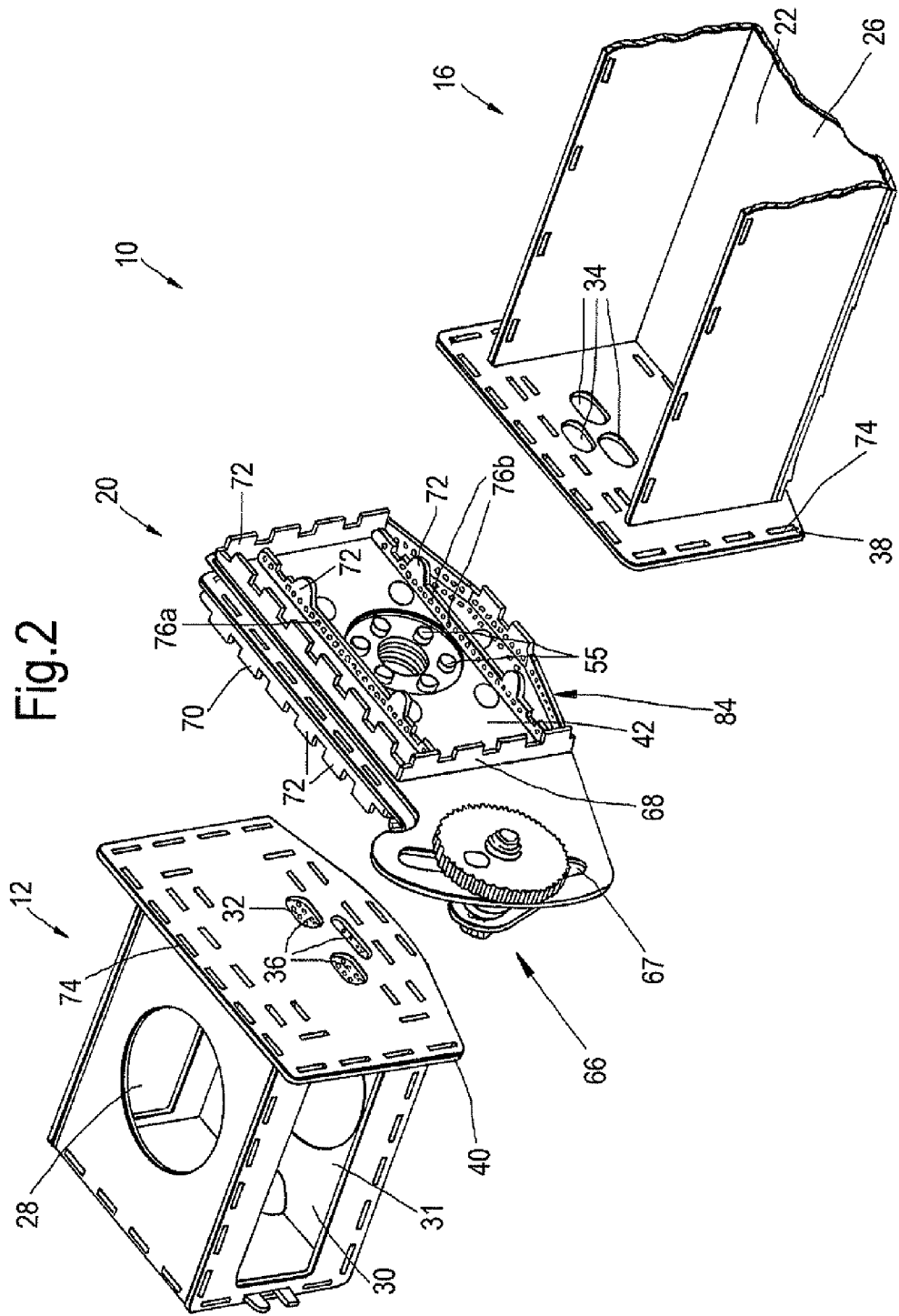
FIG. 2 is an enlarged and exploded diagrammatic perspective view of the apparatus of FIG. 1.

The mounting head 12 is also generally box-shaped and includes an aperture 28 for receiving the shaped metal deposition device 14, which may for example be a welding nozzle. The mounting head 12 also defines a chamber 30 for receiving inert gas and includes a lower panel 31 comprising a plurality of apertures 32 (only some of which are shown in FIG. 2) through which inert gas may exit the chamber 30 to provide an inert fog or cloud about the deposited shaped metal 18 in a region generally underlying the mounting head 12 and surrounding the shaped metal deposition device 14.

The inert gas shield 16 and the mounting head 12 are rotatably attached to each other via the rotatable coupling 20, and are each attached to the rotatable coupling via a respective mounting plate 38, 40. The mounting plates 38, 40 both include apertures 34, 36 to permit the transfer of inert gas from the chamber 22 of the inert gas shield 16 into the chamber 30 of the mounting head 12, via the rotatable coupling 20, such that a separate supply of inert gas does not need to be provided for the mounting head 12. The rotatable coupling 20 thus defines a gas transfer path 21 between the chamber 22 of the inert gas shield 16 and the chamber 30 of the mounting head 12 to permit the transfer of gas from the chamber 22 to the chamber 30, as will be described in further detail later in the specification.

Referring now to FIGS. 2 to 6, in more detail the rotatable coupling 20 comprises a first gas transfer plate 42, in the form of a gas inlet plate, which is connected to the mounting plate 38 of the inert gas shield, and a second gas transfer plate 44, in the form of a gas outlet plate, which is connected to the mounting plate 40 of the mounting head 12. Both the first and second gas transfer plates 42, include apertures 42a, 44a to define part of the gas transfer path 21 through the rotatable coupling 20.

A bearing arrangement 46 is provided between the first and second gas transfer plates 42, 44 and is operable to provide for relative rotation between the first and second gas transfer plates 42, 44, and hence for relative rotation between the inert gas shield 16 and the mounting head 12 which are connected respectively to the first and second gas transfer plates 42, 44.

Figure 3:
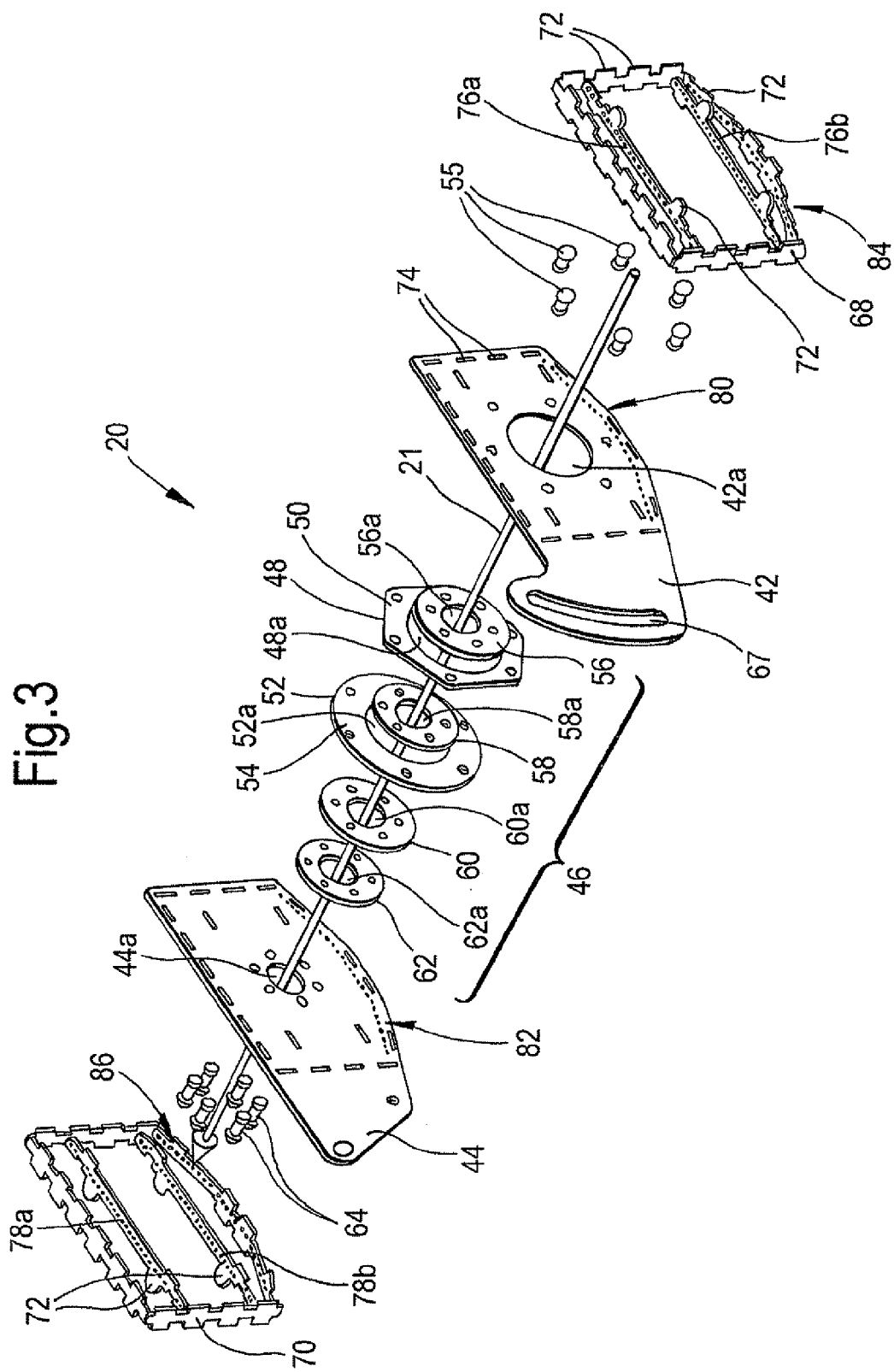
FIG. 3 is an exploded view of part of the apparatus of FIGS. 1 and 2.
Figure 4:
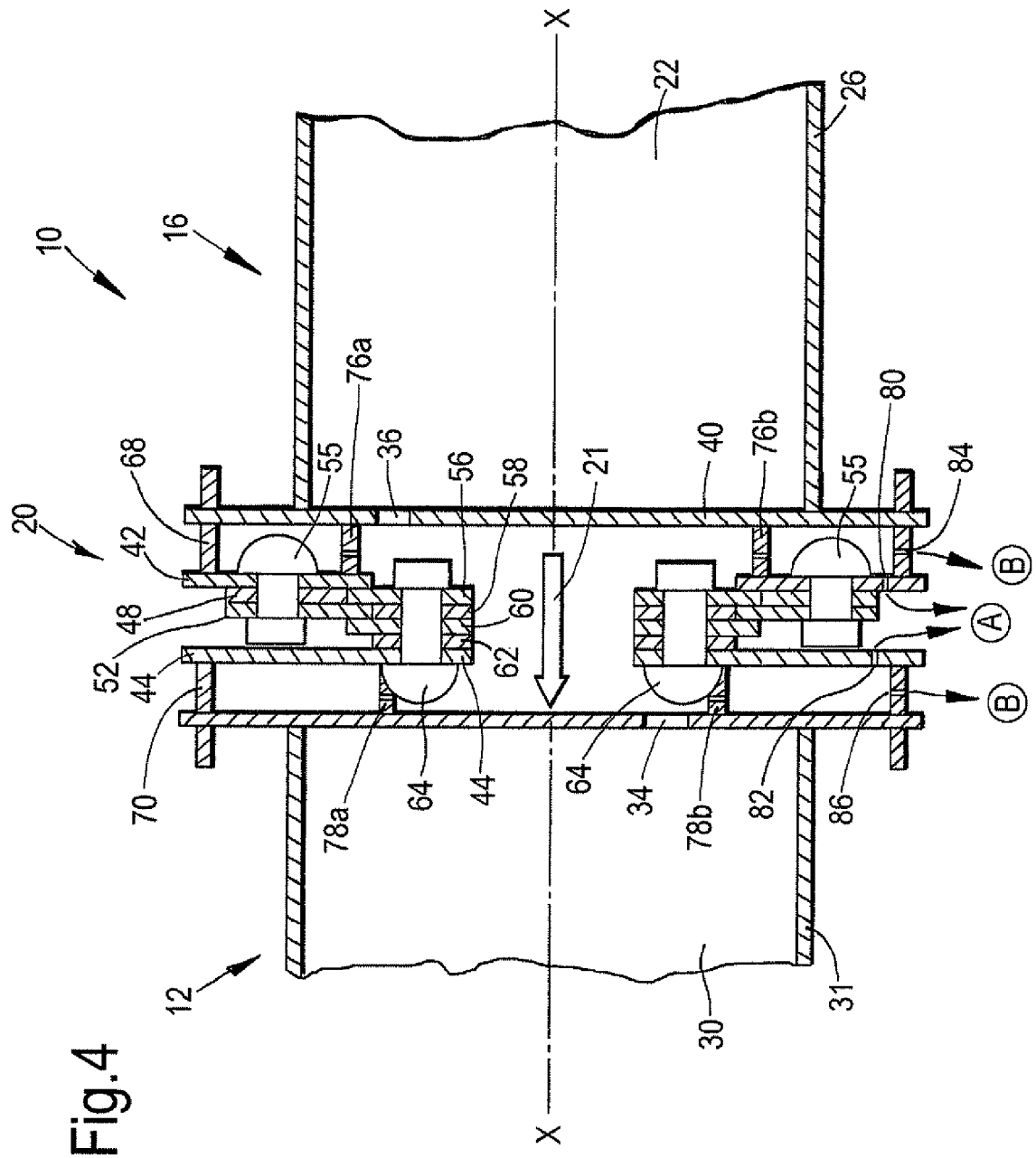
FIG. 4 is a diagrammatic cross-sectional view of part of the apparatus of FIGS. 1 to 3.
Figure 5:
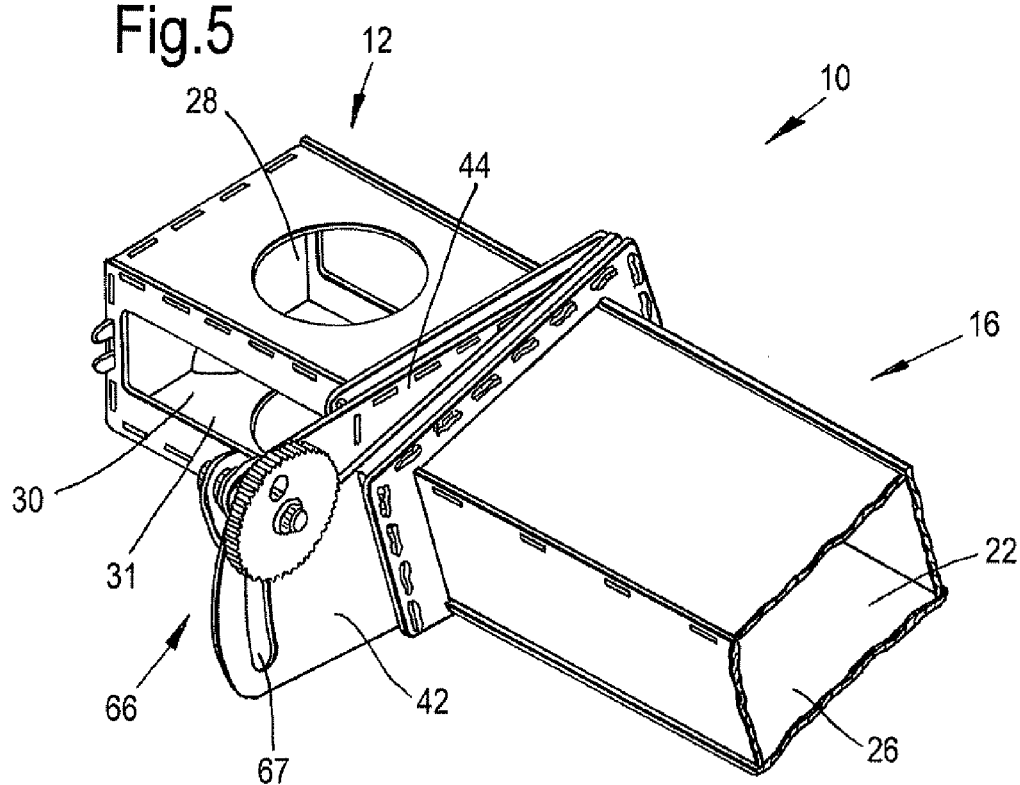
FIGS. 5 and 6 are diagrammatic perspective views of the apparatus of FIGS. 1 to 4 in different rotational positions.
Figure 6:
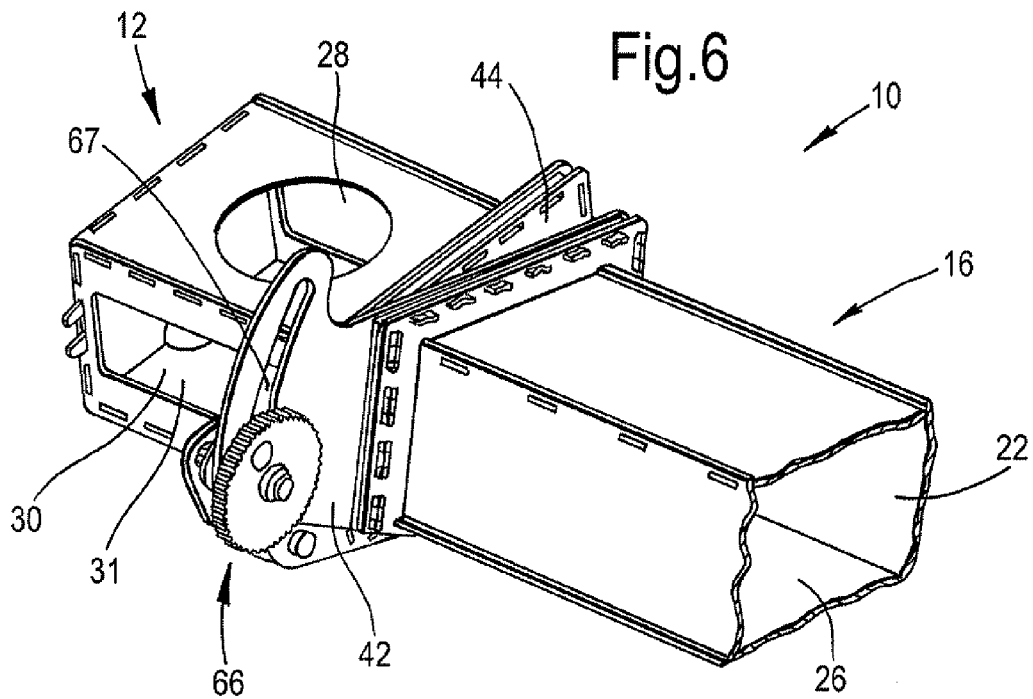

In more detail and referring in particular to FIGS. 3 and 4, the bearing arrangement 16 comprises a first annular bearing member 48 in the form of a first annular disc 50 and a second annular bearing member 52 in the form of a second annular disc 54. Both the first and second annular bearing members 48, 52 are rigidly secured to the first gas transfer plate 42 by suitable rivets 55 engageable in holes in the first gas transfer plate 42 and in the first and second annular bearing members 48, 52. As is clearly illustrated in FIG. 4, the first annular bearing member 48 abuts the first gas transfer plate 42 whilst the second annular bearing member 52 abuts the first annular bearing member 48, and is therefore spaced from the first gas transfer plate 42 by the first annular bearing member 48.

Both the first and second annular bearing members 48, include central apertures 48a, 52a, and the central aperture 48a of the first annular bearing member 48 is of a greater diameter than the central aperture 52a of the second annular bearing member 52. The first and second annular bearing members 48, 52 are rigidly attached to the first gas transfer plate 42 so that they are mounted about a common axis X-X, this being the axis of rotation of the rotatable coupling 20.

The bearing arrangement 46 also includes first, second and third annular bearing elements 56, 58, 60, each in the form of an annular disc, and a spacer element 62, all of which are rigidly attached to the second gas transfer plate 44 by suitable rivets 64 which are engageable in holes in the annular bearing elements 56, 58, 60, the spacer element 62 and the second gas transfer plate 44.

As is clearly illustrated in FIG. 4, the first annular bearing element 56 is located in the central aperture 48a defined in the first annular bearing member 48 and the second annular bearing element 58, whose outer diameter is less than the outer diameter of the first annular bearing element 56, is located in the central aperture 52a defined in the second annular bearing member 52. The central apertures 48a, 52a thus essentially provide bearing housings in which the respective first and second annular bearing elements 56, 58 are rotatable.

The third annular bearing element 60 is located adjacent to and in abutment with the second annular bearing element 58, and has an outer diameter which is greater than the outer diameter of the second bearing element 58. Finally, the spacer element 62 is interposed between the third bearing element 62 and the second gas transfer plate 44 to ensure that there is sufficient clearance between the rivets 55 and the second gas transfer plate 44.

Each of the first, second and third annular bearing elements 56, 58, 60 and the spacer element 62 comprise a respective central aperture 56a, 58a, 60a, 62a, and are rigidly attached to the second gas transfer plate 44 such that their respective central apertures 56a, 58a, 60a, 62a are mounted about the axis of rotation X-X of the rotatable coupling 20. Thus, it will be clearly seen from FIG. 4 that the apertures 42a, 44a in the first and second gas transfer plates, the apertures 48a, 52a in the first and second annular bearing members 48, 52, and the apertures 56a, 58a, 60a, 62a in the first, second and third annular bearing elements 56, 58, 60 and the spacer element 62 together define the gas transfer path 21 which permits the transfer of gas from the chamber 22 of the inert gas shield 16 to the chamber 30 of the mounting head 12.

In order to effect the rigid attachment of the respective components of the bearing arrangement 46 to the first and second gas transfer plates 42, 44, the first annular bearing member 48 is offered up to the first gas transfer plate 42, the first annular bearing element 56 is located in the aperture 48a defined in the first annular bearing member 48, and finally the second annular bearing member 52 is offered up to the first annular bearing member 48, before the rivets 55 are located through the holes in the first gas transfer plate 42 and in the first and second annular bearing members 48, 52 to effect the required rigid attachment. Although the first annular bearing element 56 is not rigidly attached to the first gas transfer plate 42, it is held in position in the aperture 48a of the first annular bearing member 48 due to the fact that the adjacent aperture 52a of the second annular bearing member 52 is of a smaller diameter. Axial movement of the first annular bearing element 56 is thus prevented as it is effectively sandwiched axially between the first gas transfer plate 42 and the second annular bearing member 52.

Rigid attachment of the respective components of the bearing arrangement 46 to the first and second gas transfer plates 42, 44 is completed by locating the rivets 64 through the holes in the second gas transfer plate 44, in the spacer element 62, in the third and second annular bearing elements 60, 58, and finally in the first annular bearing element 56 to thereby bring the rotatable coupling 20 together. Finally, the rivets 64, which are accessible through the central aperture 42a in the first gas transfer plate 42, are deformed to complete the assembly.

The bearing arrangement 46 described above permits rotation up to 360° between the first gas transfer plate 42 and the second gas transfer plate 44, and hence between the inert gas shield 16 and the mounting head 12. In some embodiments, the rotatable coupling 20 includes a rotation limiter 66 to limit the amount of relative rotation and permit only a predetermined amount of relative rotation. Typically, the rotation limiter 66 extends between the first and second gas transfer plates 42, 44, and in the illustrated embodiment the amount of permitted relative rotation is determined by the length of a slot 67 provided in the first gas transfer plate 42. This is clearly illustrated in FIGS. 5 and 6 which show the rotatable coupling 20 at opposite extremes of the permitted amount of relative rotation. In some embodiments, the rotation limiter 66 is operable to secure the first and second gas transfer plates 42, 44 in desired rotational positions, intermediate the extreme rotational positions illustrated in FIGS. 5 and 6, relative to each other.

In order to effect attachment of the rotatable coupling 20 to the mounting head 12 and the inert gas shield 16 to rotatably couple them to each other, first and second connecting members 68, 70 are provided. The first connecting member 68 is secured to the mounting plate 38 of the inert gas shield 16 and to the first gas transfer plate using twist-dowel connectors 72 engageable in appropriate slots 74 provided in the mounting plate 38 and the first gas transfer plate 42. Similarly, the second connecting member 70 is secured to the mounting plate 40 of the mounting head 12 and to the second gas transfer plate using twist-dowel connectors 72 engageable in appropriate slots 74 provided in the mounting plate 40 and the second gas transfer plate 44.

In the illustrated embodiment, the rotatable coupling 20 further includes lateral reinforcement members 76a, 76b, 78a, 78b associated respectively with each of the first and second connecting members 68, 70. The lateral reinforcement members 76a, 76b, 78a, 78b each include twist-dowel connectors 72 engageable in appropriate slots 74 provided in the mounting plates 38, 40 and the first and second gas transfer plates 42, 44. Typically, the lateral reinforcement members 76a, 76b, 78a, 78b are secured to the respective connecting member 68, 70. It is worth noting that typically, the first and second connecting members 68, 70 and the lateral reinforcement members 76a, 76b, 78a, 78b are attached to the respective first or second gas transfer plate 42, 44 prior to assembly of the bearing arrangement 46 between the first and second gas transfer plates 42, 44, in the manner described above.

In some embodiments, the first and second gas transfer plates 42, 44 each include a row of gas distribution ports 80, 82 which direct a proportion of the inert gas passing through the rotatable coupling 20 from the inert gas shield to the mounting head 12 towards deposited shaped material in an area generally underlying the rotatable coupling 20, as indicated by the arrows A in FIG. 4. The first and second connecting members 68, 70 also include a plurality of such gas distribution ports 84, 86, along a lowermost edge thereof, which again allow a proportion of the inert gas flowing through the rotatable coupling 20 to flow towards deposited shaped material in an area generally underlying the rotatable coupling 20, as indicated by the arrows B in FIG. 4. In order to ensure that inert gas can flow towards the gas distribution ports 80, 82, 84, 86, the lateral reinforcement members 76a, 76b, 78a, 78b are perforated to permit the passage of inert gas therethrough.

Although embodiments of the invention have been described in the preceding paragraphs with reference to various examples, it should be appreciated that various modifications to the examples given may be made without departing from the scope of the present invention, as claimed. For example, the bearing arrangement 46 may be of an alternative configuration. Alternative means to the first and second connecting members 68, 70 may be provided for attaching the rotatable coupling 20 to the inert gas shield 16 and the mounting head 12.

The invention claimed is:

1. A shaped metal deposition apparatus for providing an inert atmosphere to deposited metal comprising:
    a mounting head configured to provide an inert atmosphere around shaped metal deposited by a shaped metal deposition device in a first region;
    an inert gas shield configured to provide an inert atmosphere around shaped metal deposited by the shaped metal deposition device in a second region, the second region being different than the first region; and
    a rotatable coupling disposed between the mounting head and the inert gas shield to permit relative rotation therebetween, wherein
    the rotatable coupling includes:
        a first gas transfer plate connected to the inert gas shield, and
        a second gas transfer plate connected to the mounting head, the first gas transfer plate and the second gas transfer plate being parallel to one another; and
    the rotatable coupling defines a gas transfer path for transferring inert gas from the inert gas shield to the mounting head.

2. The shaped metal deposition apparatus according to claim 1, wherein the inert gas shield is arc-shaped.

3. The shaped metal deposition apparatus according to claim 1, wherein the rotatable coupling further includes:
    a bearing arrangement between the first and second gas transfer plates, the bearing arrangement being operable to permit relative rotation between the first and second gas transfer plates, and hence said relative rotation between the mounting head and the inert gas shield.

4. The shaped metal deposition apparatus according to claim 3, wherein the bearing arrangement includes first and second annular bearing members rigidly secured to one of the first and second gas transfer plates.

5. The shaped metal deposition apparatus according to claim 4, wherein the first annular bearing member is in abutment with one of the first and second gas transfer plates and the second annular bearing member is in abutment with the first annular bearing member, the first and second annular bearing members being rigidly secured to said one of the first and second gas transfer plates such that central apertures defined in the first and second annular bearing members are arranged about a common axis.

6. The shaped metal deposition apparatus according to claim 5, wherein the central aperture defined in the first annular bearing member is of a greater diameter than the central aperture defined in the second annular bearing member.

7. The shaped metal deposition apparatus according to claim 4, wherein the bearing arrangement includes a plurality of annular bearing elements rigidly secured to the other of the first and second gas transfer plates.

8. The shaped metal deposition apparatus according to claim 7, wherein the plurality of annular bearing elements comprises a first annular bearing element located in the central aperture defined in the first annular bearing member and a second annular bearing element in abutment with the first annular bearing element and located in the central aperture defined in the second annular bearing member.

9. The shaped metal deposition apparatus according to claim 8, wherein the plurality of annular bearing elements comprises a third annular bearing element in abutment with the second annular bearing element and having an outer diameter greater than the outer diameter of the second annular bearing element.

10. The shaped metal deposition apparatus according to claim 9, wherein the bearing arrangement includes an annular spacer element in abutment with the third annular bearing element and said other of the first and second gas transfer plates, the spacer element also being rigidly secured to said other of the first and second gas transfer plates.

11. The shaped metal deposition apparatus according to claim 10, wherein the plurality of annular bearing elements and the annular spacer element are rigidly secured to said other of the first and second gas transfer plates such that central apertures defined in the plurality of annular bearing elements and the annular spacer element are arranged about a common axis.

12. The shaped metal deposition apparatus according to claim 1, wherein the rotatable coupling defines a gas transfer path for transferring inert gas from the inert gas shield to the mounting head.

13. The shaped metal deposition apparatus according to claim 3, wherein one or both of the first and second gas transfer plates includes a plurality of gas distribution ports to direct inert gas towards deposited shaped metal in an area underlying the rotatable coupling, between the inert gas shield and the mounting head.

14. The shaped metal deposition apparatus according to claim 3, wherein the apparatus includes first and second connecting members for connecting the first and second gas transfer plates to the inert gas shield and the mounting head.

15. The shaped metal deposition apparatus according to claim 14, wherein one or both of the first and second connecting members includes a plurality of gas transfer ports to direct inert gas towards deposited shaped metal in an area underlying one or both of the first and second connecting members.

16. The shaped metal deposition apparatus according to claim 12, wherein one or both of the first and second connecting members includes at least one lateral reinforcement member, the or each lateral reinforcement member being perforated to permit the passage of inert gas therethrough.

17. The shaped metal deposition apparatus according to claim 1, wherein the rotatable coupling is arranged to permit relative rotation between the mounting head and the inert gas shield by an amount up to 360°.

18. The shaped metal deposition apparatus according to claim 1, wherein the rotatable coupling includes a rotation limiter to permit up to a predetermined amount of relative rotation between the mounting head and the inert gas shield.

19. The shaped metal deposition apparatus according to claim 3, wherein the rotatable coupling includes a rotation limiter to permit up to a predetermined amount of relative rotation between the mounting head and the inert gas shield; and wherein the rotation limiter extends between the first and second gas transfer plates to limit the relative rotation between the plates.

* * * * *